Nov. 9, 1965     L. ERDELY     3,216,260
FLUID PRESSURE DETECTION
Filed Oct. 20, 1961
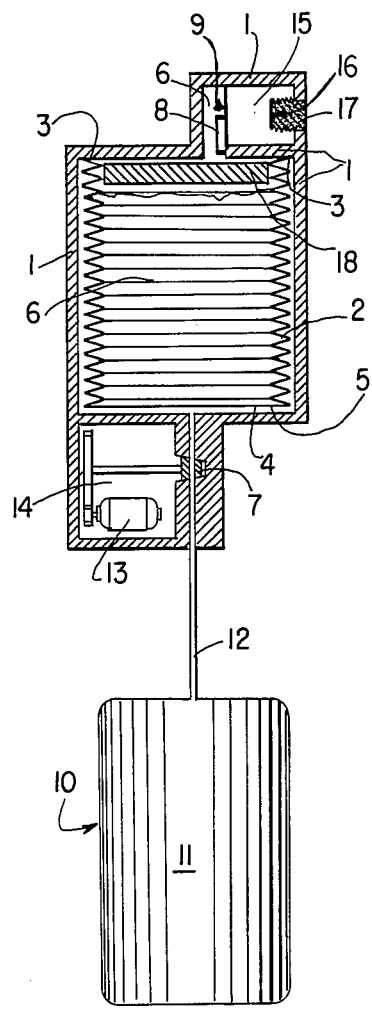
INVENTOR.
LADISLAS ERDELY
BY
Ooms, McDougall & Hersh
ATTYS.

United States Patent Office 3,216,260
Patented Nov. 9, 1965

3,216,260
FLUID PRESSURE DETECTION
Ladislas Erdely, Paris, France, assignor to Pechiney, Compagnie de Produits Chimiques et Electrometallurgiques, Paris, France
Filed Oct. 20, 1961, Ser. No. 146,511
Claims priority, application France, Oct. 20, 1960, 841,692
3 Claims. (Cl. 73—398)

This invention relates to means for detecting the pressure in fluids. A particular application of the concepts of this invention concerns the measurement of pressure differentials developed by tides and other water head variations. The devices of this invention are adapted to detect and record the forces which result from these phenomena whereby the forces can be compared and studied. The inventive devices are particularly characterized by the ability to detect with great precision small pressure variations which are periodical or disordered and which occur over long periods of time. The devices will measure pressures of extremely low intensity compared to the absolute pressure to which the devices are subjected.

There has not been available any means capable of measuring forces and pressures of tides in the high seas. Present devices are all designed for use along coast lines where a fixed reference point for pressure can be established. It is important to those involved in oceanographic research to determine pressure variations apart from those occurring near a coast line. With such information it will be possible, among other things, to trace the path of enormous water masses which are put into motion during a tide cycle.

It is an object of the present invention to provide a means which will enable precise measurement of the forces and pressures developed in the high seas as a result of changes in tides or other changes in water head.

It is an additional object of this invention to provide a means capable of detecting small variations in pressure which occur over long periods of time in the high seas.

These and other objects of this invention will appear hereinafter and, for purposes of illustration, but not of limitation, a specific embodiment of this invention is shown in the accompanying drawing wherein the figure is an elevational view in section of one embodiment of a pressure detecting until capable of achieving the above objects.

The objects of this invention can be accomplished by means of a device which includes first and second chambers within a housing. A constant pressure is maintained in one of the chambers and the second chamber is adapted to be exposed to pressure in a surrounding medium. Means are provided in the device for detecting any pressure differentials which may occur due to relative changes between the pressure of the surrounding medium and the constant pressure.

More specific units employed in the measurement of water head variations in the high seas include devices provided with a gas containing bellows in a first chamber. A flexible container holding a fluid is provided in communication with the first chamber and the flexible container is adapted to be compressed when the device is immersed in the sea. A valve means is provided between the flexible container and the first chamber and the valve means is closed after the pressure of the sea has resulted in passage of fluid from the flexible container into the first chamber. With this arrangement a constant pressure proportional to the pressure of the sea at the time the device is lowered is built up in the first chamber. Therefore, the gas containing bellows in the first chamber is compressed a specific amount and maintained in this position during the entire operation of the device.

A detecting means is provided in communication with the first chamber now maintained at constant pressure. The detecting means preferably comprises a vibrating string extensometer adapted to transmit sound in accordance with the tension therein. A movable means is connected to one end of the extensometer and the movable means is provided in communication with a second chamber. A fluid is preferably disposed in the second chamber and a second movable means is provided for closing off the second chamber from exposure to the sea water. Changes in pressure between the sea water which will be occasioned by changes in tide will result in transmission of pressure to the second movable means through the fluid in the second chamber and to the first movable means. As a result the tension in the extensometer will be changed and a sound variation will be transmitted by the extensometer, the sound variation being proportional to the pressure variation in the sea.

There are, of course, many pressure variations which are highly transient as opposed to the prolonged variations which characterize tide changes. For this reason, the devices of this invention are provided with damping means which avoid recording of transient pressure changes. Specifically, a semi-pervious plug can be provided for direct exposure to the sea. The plug will cause a lag in transmission of pressure variations in the sea to the movable wall connected to the extensometer. With this built in damping device, only pressure variations which are sustained will cause recording of variations in sea pressure.

It will thus been seen that the objects of this invention are achieved by immersing a device of the type described into a fluid which may be the ocean waters. By maintaining the device in a fixed position, such as on the sea floor or on the bottom of a vessel containing a fluid, pressure variations in the fluid can be accurately recorded. The use of a vibrating string strain gage, such as is preferred in the practice of this invention, will provide a precise measuring tool, since variations in the pitch of the sound emanated by the string can be accurately measured by well known equipment.

Referring to the drawings, there is shown a device which characterizes the features of this invention. The device includes a housing 1 which may be formed of any rigid material including metal or plastic. Stainless steel or aluminum housings are desirable due to their corrosion resistance, and the housing may be of any shape although a generally cylindrical shape is preferred.

A bellows 2 is positioned within the housing and is adapted for folding upon itself. The bellows may be formed of any of several fluid and vapor impervious materials including rubber, plastics or metal. The bellows is secured at 3 to the housing 1, while the closed end 4 is freely suspended within the housing. The chamber 6 formed by the bellows is filled with a fluid, preferably gas, which is adapted to be compressed when the bellows is caused to fold. The space 5 formed outside the bellows within the housing is provided in communication with the outside of the housing by means of a cock or needle valve 7.

An acoustic string 8 of the type used in vibrating string extensometers is attached at one end to the housing 1 and at the other end to a membrane 9. Any well known device, not shown and not forming a part of this invention, can be provided for energization of the string thus enabling transmission of a sound emitted by the string to detecting and recording mechanisms.

The membrane 9 forms a movable partition in the device and is formed of a material impervious to gas and liquid. It is preferably formed of a metallic film such as steel or aluminum and it is disposed within the housing by means of a sealed connection at its edges.

In a preferred form of this invention, a flexible container 10 filled with a liquid 11 is connected to the space 5 by means of the conduit 12. The container may be formed of rubber, plastic or a thin metallic material and is adapted to be deformed by means of fluid pressure surrounding the container. Any of various liquids can be disposed within the container such as water, hexane, pentane, gasoline, petroleum solvent or silicone base fluid oil. The valve 7 is provided for closing off communication between the container 10 and the housing 1. The valve is preferably remotely controllable and, for this purpose, a small motor 13 can be placed in the chamber 14 for operation of the valve. Obviously control means for the motor can be provided in a ship or other station located above the device.

The chamber 15 formed in the housing 1 and partitioned by means of the membrane 9 is filled with a comparatively uncompressible liquid such as silicone base oil. In communication with the chamber 15, there is provided a membrane 16 positioned at the end of a semi-pervious plug 17. The plug 17 has its other end exposed to the fluid in which the device is immersed.

The plug 17 provides a damping mechanism for the device of this invention. Specifically, the plug provides for a lag of transmission of pressure built up to the membrane 16, the fluid in chamber 15 and to the membrane 9. As explained, transient and quickly dissipating pressure increases will, therefore, not result in sound variations in the extensometer 8. The plug 17 may be made out of any water semi-pervious material, for example, a refractory material such as sintered glass.

A packing mass 18 is positioned at the top of the chamber 6 to act as a stop for the bottom 4 of the bellows 2. The volume of the mass 18 provides for a decrease in the volume which is available for gas in the chamber 6. By properly selecting the volume of the mass 18, the gas available volume in the chamber 6 can be limited to the minimum materially required by the extensometer string 8.

In operation the tide measuring apparatus can be placed on any mechanism employed for oceanographic sounding purposes. The device can be lowered into the sea and stopped at any level, although preferably the device is disposed on the sea floor.

With the device so immersed, the container 10 will be subjected to a pressure equal to that of the then existing water head. With the valve 7 open, the fluid 11 will flow into the space 5 and the bellows 2 will be compressed. When movement of the bellows is completed, the valve 7 will be closed and the pressure within the chamber 6 will thus remain constant throughout operation of the device. It will be apparent that the membrane 9 will be subjected to a constant pressure corresponding to the pressure in the chamber 6 and corresponding to the pressure exerted by the water head when the device is initially immersed. The spring 8 will at this time emit a sound, the pitch of the sound providing a reference point upon which all future calculations will be based.

The plug 17 will, of course, be exposed to the prevailing sea pressure. Any sustained changes in this pressure will result in increase of pressure on the membrane 16 and the noncompressible fluid in the chamber 15 will therefore be subjected to force by reason of movement of the membrane 16. Accordingly, the fluid in chamber 15 will cause movement of the membrane 9. It will be apparent that the tension in the string 8 will be thus varied and that the pitch variation detected will be proportional to the pressure change in the water head. The frequency of the variable sound emitted by the extensometer string can be directly measured and/or registered and a permanent record obtained for future calculation and study.

It will be apparent that the bellows 2 and membrane 9 are not placed in direct contact with the fluid such as the sea water. It will be clear, however, that the plug 17 and the membrane 16 as well as the container 10 could be eliminated whereby sea water or other fluid will result in positioning of the bellows 2 and moving of the membrane 9. This direct exposure modification is, however, not preferred, particularly for the reason that the valve could become clogged by the sea water deposits.

It has been established that with the device of this invention weak and sustained pressure variations can be accurately detected and measured in the high seas. The device of this invention thus provides for the recovery of information which will enable a thorough study of the forces generated in tide movements.

In applicant's copending application Serial No. 143,193, entitled Pressure Gage, filed October 5, 1961, there is described a device which is adapted for the measurement of rapid pressure variations in the seas resulting from wave motion at the surface. The present unit can be employed for similar purposes by eliminating the damping mechanism described. With this arrangement rapid pressure variations will have a direct effect on the movable membrane 9 and will accordingly provide pitch variations of the type described.

It will be understood that various modifications may be made in the above described pressure detecting system which provides the characteristics of this invention without departing from the spirit thereof, particularly as defined in the following claims.

I claim:

1. A device for measurement of long amplitudes of fluid pressure variations comprising a rigid housing, a first chamber and a second chamber within the housing, a deformable container within said first chamber and mounted in sealing relation therein, a passage communicating said second chamber with the interior of the container, a fluid filling the space within the first chamber outwardly of the container, another fluid-tight deformable container outwardly of the housing and filled with a fluid, means communicating the interior of said other container with the interior of the first chamber outwardly of the container therein, valve means within said communicating means for establishing communication between the other container and the first chamber when in open position and for sealing said other container from the first chamber when in closed position whereby the pressure conditions existing in the first chamber may be adjusted for stabilization in accordance with the depth of the device and wherein such stabilized adjustment can be retained in the first chamber when the valve means is in closed position, a flexible member subdividing the second chamber into an inner compartment in communication with the container and an outer compartment, a fluid filling said outer compartment, a semipermeable dampening means interposed between said outer compartment and the fluid the pressure of which is to be measured for transmission of pressure change from the fluid outside of the housing to the flexible member, and a vibrating string extensometer having one end connected to said flexible member while the other end is connected to said housing whereby movements of the flexible member responsive to pressure change will result in variations in tension in said extensometer.

2. A device as claimed in claim 1 in which the container within the first chamber comprises a bellows.

3. A device for measurement of long amplitudes of fluid pressure variations comprising a rigid housing, a first chamber and a second chamber within the housing, a deformable container within said first chamber and mounted in sealing relation therein, a passage communicating said second chamber with the interior of the container, a fluid filling the space within the first chamber outwardly of the container, another fluid-tight deformable container outwardly of the housing and filled with a fluid, means communicating the interior of said other container with the interior of the first chamber outwardly of the container therein, valve means within said communicating means for establishing communication between the other container and the first chamber when in open position and for sealing said other container from the first chamber when in closed position whereby the pressure conditions existing in the first chamber may be adjusted for stabilization in accordance with the depth of the device and wherein such stabilized adjustment can be retained in the first chamber when the valve means is in closed position, a flexible member subdividing the second chamber into an inner compartment in communication with the container and an outer compartment, a fluid filling said outer compartment, a passage communicating said outer compartment with the fluid the pressure of which is to be measured for transmission of pressure change from the fluid outside of the housing to the fluid within the outer compartment, a porous plug in the passage communicating the outer compartment with the fluid, the pressure of which is to be measured, whereby only sustained changes in pressure will be transmitted through the porous plug to the fluid filling the outer compartment, and a vibrating string extensometer having one end connected to said flexible member with the other end connected to said housing whereby movements in the flexible member responsive to pressure change will result in variations in tension in said extensometer and means for measuring said variations in tension.

References Cited by the Examiner

UNITED STATES PATENTS

| | | | |
|---|---|---|---|
| 2,637,999 | 5/53 | Klebba | 73—301 |
| 2,700,306 | 1/55 | Johnson | 73—395 X |
| 2,750,796 | 6/56 | Knoll et al. | 73—398 X |
| 2,769,341 | 11/56 | De Boisblanc | 73—398 |
| 3,000,216 | 9/61 | Peters et al. | 73—398 |

RICHARD C. QUEISSER, *Primary Examiner.*

DAVID SCHONBERG, *Examiner.*